United States Patent [19]

Machida

[11] 4,318,132
[45] Mar. 2, 1982

[54] AUTOMATIC EXPOSURE CONTROL APPARATUS FOR TELEVISION CAMERAS

[75] Inventor: Toyotaka Machida, Yokohama, Japan

[73] Assignee: Victor Company of Japan, Limited, Yokohama, Japan

[21] Appl. No.: 128,876

[22] Filed: Mar. 10, 1980

[30] Foreign Application Priority Data

Mar. 13, 1979 [JP] Japan .................................. 54-28977

[51] Int. Cl.³ ............................................. H04N 5/26
[52] U.S. Cl. ................................................. 358/228
[58] Field of Search .......................................... 358/228

[56] References Cited

U.S. PATENT DOCUMENTS 3,445,590 5/1969 Dischert et al. ..................... 358/228
3,555,181 1/1971 Thommen .......................... 358/228

*Primary Examiner*—Richard Murray
*Attorney, Agent, or Firm*—Lowe, King, Price & Becker

[57] ABSTRACT

An automatic exposure control apparatus for television cameras comprises a gain controlled amplifier receptive of a video signal derived from the target of the camera tube, and a modulating waveform generator which supplies a modulating signal to the control input of the gain controlled amplifier to provide amplitude modulation of the video signal. The modulated video signal is coupled to a smoothing circuit which delivers a d.c. signal corresponding in magnitude to an average value of the input signal applied thereto to an electromechanical transducer which drives an iris diaphragm to adjust the exposure setting. The modulating signal is generated in response to each pulse of either horizontal or vertical synchronization so that the video signal derived from a predetermined area of the target experiences a lower degree of amplification than that derived from the other area.

8 Claims, 8 Drawing Figures

AUTOMATIC EXPOSURE CONTROL APPARATUS FOR TELEVISION CAMERAS

BACKGROUND OF THE INVENTION

The present invention relates to an automatic exposure control apparatus for television cameras for automatically setting the exposure to light incident on the target of the television camera tube in response to a feedback control signal derived from a video signal, wherein the video signal is modulated in amplitude with a predetermined waveform generated in response to a synchronization pulse.

In the known television camera, the video signal is utilized for purposes of controlling the amount of light incident on the target surface. It is sometimes the case however when an extremely bright scene suddenly comes into view during a camera movement, the amount of incident light is reduced according to the maximum peak value of the video signal so that the intensity of the light incident on the relatively dark area of the televised view is excessively reduced.

A prior art approach to this problem involves detecting a video signal derived from a center area of the target surface and adjusting the exposure setting in response thereto. This prior art approach is also unsatisfactory since it results in a peripheral area of the target being over-exposed if that area has an extremely high brightness compared with the center area, which often occurs when the upper area of the scene is occupied with a clear sky view while the other part of the scene has a low brightness level.

SUMMARY OF THE INVENTION

The present invention contemplates to provide a counter-acting operation to the tendency of a feedback control system toward over-exposing a portion of the target by modulating the amplitude of a feedback video signal with a waveform generated in response to each synchronization pulse of either horizontal or vertical deflection. The modulated video signal is fed into a smoothing circuit for generating a d.c. signal corresponding to an average value of the modulated input signal. An iris diaphragm disposed in the path of light incident on the target of the camera tube is controlled in response to the d.c. signal to automatically adjust the exposure setting.

The modulating waveform may take an appropriate shape according to a particular feature of the scene to be televised. In one embodiment, a parabolic wave is generated in response to each horizontal synchronization pulse so that the feedback video signal derived from the right or left area of the target surface undergoes a lower degree of amplification than the video signal derived from the other area. In another embodiment, a pseudo-parabolic wave is generated in response to each vertical synchronization pulse. The amplitude modulation of the video signal with the pseudo-parabolic wave permits the video signal derived from the upper area of the target to experience a lower degree of amplification than that derived from the other area.

The horizontal and vertical modulating waveforms may be employed singly or in combination for amplitude modulation of the feedback video signal to meet the specific feature of the televised scene.

BRIEF DESCRIPTION OF THE DRAWINGS

The present invention will be further described by way of example with reference to the accompanying drawings, in which.

DETAILED DESCRIPTION

Figure 1:
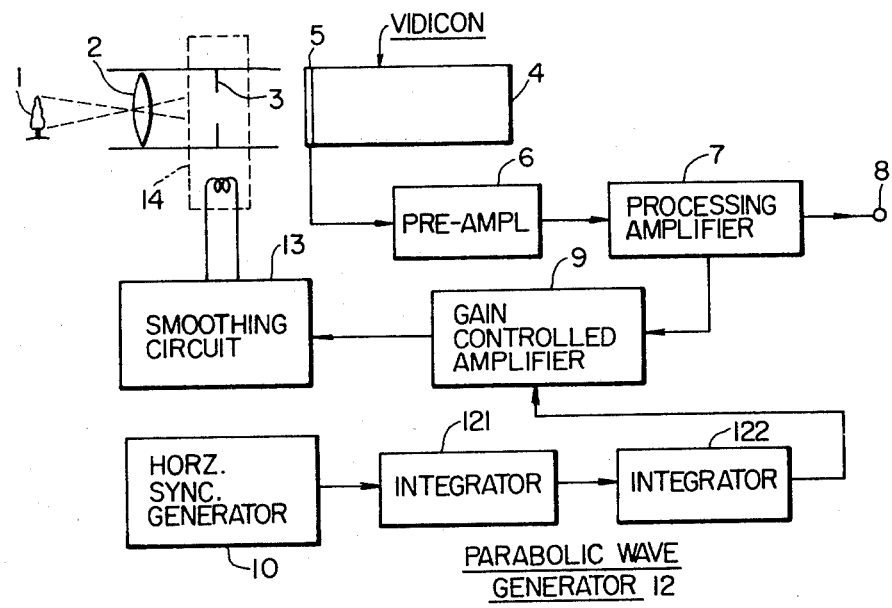
FIG. 1 is an illustration of a schematic block diagram of a first embodiment of the invention.

Referring now to FIG. 1, a first preferred embodiment of the present invention is schematically illustrated. An image from an object 1 is focused by means of an object lens 2 onto the surface of a photoelectrical conversion target 5 of a television camera tube or Vidicon tube 4 through an iris diaphragm 3 of an exposure setting mechanism 14. This exposure setting mechanism is responsive to a d.c. signal supplied from a smoothing circuit 13 to automatically adjust the amount of light incident on the target 5 through the action of a feedback loop circuit. This feedback circuit includes a preamplifier 6 connected to the target 5 to provide linear amplification of the video signal which is derived in a well known manner by a scanned electron beam in response to horizontal and vertical synchronization pulses. The amplified video signal is applied to a known process amplifier 7 which provides clipping, amplification and gamma compensation of the video signal and supplies its output through a terminal 8 to an associated circuit, not shown, of the television camera. An output from the clipper circuit of the process amplifier 7 is conveniently utilized for the present invention and supplied to a first input of a gain controlled amplifier 9, the output of which is coupled to the smoothing circuit 13 to derive the d.c. control signal. To the second input of the gain controlled amplifier 9 is supplied a modulating signal from a modulating circuit 12 to control the degree of amplification of the amplifier 9 in accordance with the invention.

In the absence of the modulating signal, the d.c. exposure control signal varies in magnitude corresponding to the average value of the intensity of light incident on the full area of the target 5. Therefore, a televised scene having an excessively bright area can result in a d.c. control signal of an excessive magnitude which reduces the amount of the incident light so that the dark area of the target is under-exposed.

In accordance with the invention the input signal to the gain controlled amplifier 9 is modulated in amplitude with the modulating signal for purposes of counter-acting the excessive action of the feedback circuit to prevent under-exposure of the relatively dark area of the televised scene.

Figure 2:
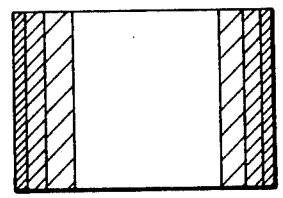
FIG. 2 is an illustration of the photoelectrical conversion target of a camera tube with hatched areas showing different degrees of amplification of the feedback signal associated with the FIG. 1 embodiment.
Figure 7:
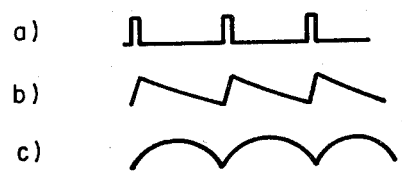
FIG. 7 is an illustration of waveforms associated with the embodiments of FIGS. 1 and 5.

The modulating circuit 12 comprises a first integrator 121 which receives horizontal synchronization pulses (FIG. 7a) from a horizontal sync generator 10 of the television camera to generate a train of sawtooth wave pulses (FIG. 7b). The latter is applied to a second integrator 122 having a different time constant value from that of the first integrator to shape the input sawtooth wave pulses into parabolic wave pulses (FIG. 7c). Therefore, the input signal to the gain controlled amplifier 9 derived from the right or left area of the target 5 experiences a lower degree of amplification than the signal derived from the center area. The amplification decreases gradually as a function of distance to the right or left edge of the target 5 as indicated by hatched areas in FIG. 2. This embodiment is particularly advantageous for televising an indoor scene in which daylight outdoor view is seen through a window located on the right or left side of the scene and creates a sharp contrast with the other area.

Figure 3:
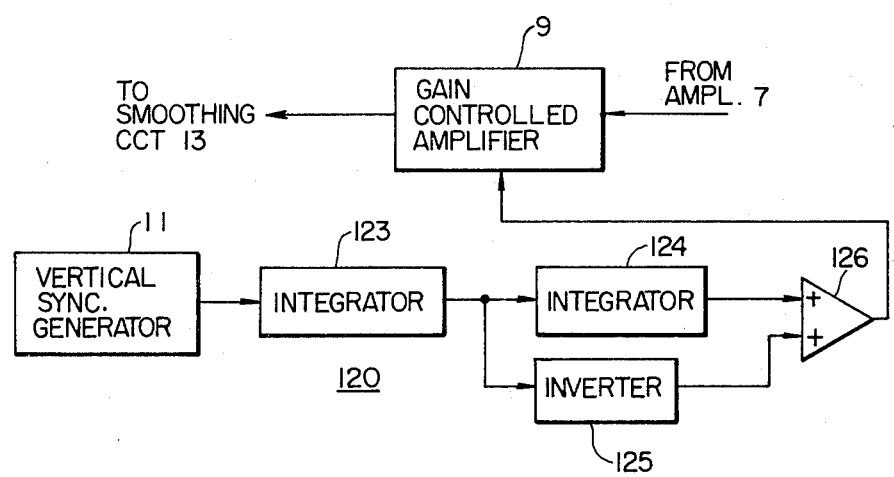
FIG. 3 is an illustration of a schematic block diagram of a second embodiment of the invention.
Figure 4:
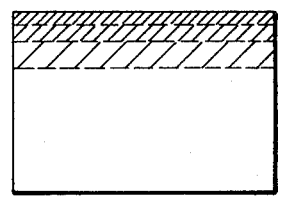
FIG. 4 is an illustration of the photoelectrical conversion target of the camera tube with hatched areas showing different degrees of amplification of the feedback signal associated with the FIG. 3 embodiment.
Figure 8:
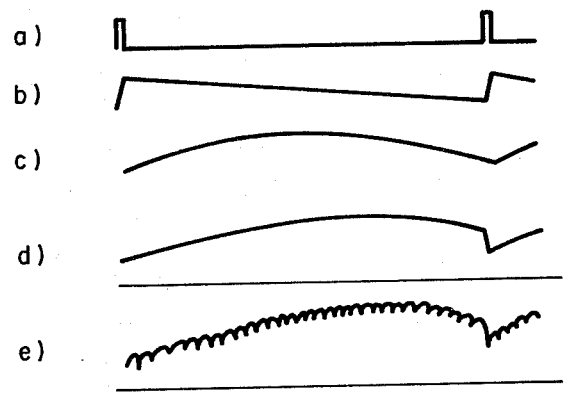
FIG. 8 is an illustration of waveforms associated with the embodiments of FIGS. 3 and 5.

A second embodiment of the invention is illustrated in FIG. 3 in which the gain controlled amplifier 9 receives its modulating signal from a pseudo-parabolic wave generator 120. This generator includes a first integrator 123 which receives vertical synchronization pulses (FIG. 8a) from the vertical sync generator 11 of the television camera to generate vertical sawtooth wave pulses (FIG. 8b). This vertical sawtooth wave pulse is applied to a second integrator 124 to generate a parabolic wave pulse during each vertical scan interval (FIG. 8c) and applied to a first input of an adder or combining circuit 126. The vertical sawtooth pulse is also supplied to an inverting circuit 125 in which the input waveform is converted into an waveform which is an inverse of the input. The output of this inverting circuit is coupled to a second input of the adder 126 to provide a combined output (FIG. 8d) to the gain controlled amplifier 9. Therefore, during each vertical scan interval the light-intensity input signal to the gain controlled amplifier 9 derived from the upper area of the target 5 experiences a lower degree of amplification than the signal derived from the lower part of the target. This amplification decreases gradually as a function of distance to the upper edge of the target 5 as indicated by the hatched area of FIG. 4. This embodiment is particularly advantageous for televising a daylight outdoor scene in which the bright sky produces a sharp image contrast with the rest of the scene.

Figure 6:
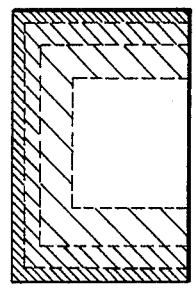
FIG. 6 is an illustration of an explanatory view associated with the FIG. 5 embodiment with hatched areas showing different degrees of amplification of the feedback signal.
Figure 5:
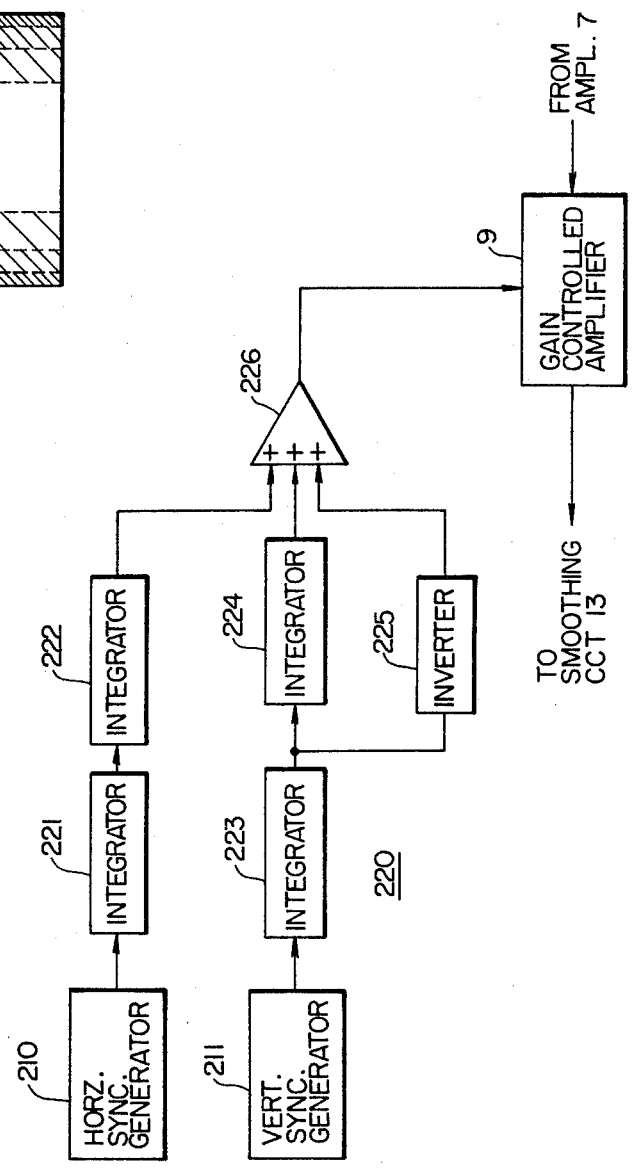
FIG. 5 is an illustration of a schematic block diagram of a third embodiment of the invention.

FIG. 5 is an illustration of a third embodiment of the invention in which the features of the previous embodiments are combined. For this purpose a combined waveform generator 220 is provided which comprises cascaded integrators 221 and 222 respectively of the identical construction to the integrators 121 and 122 of FIG. 1 to generate parabolic wave pulses in response to the horizontal synchronization pulses supplied from a horizontal sync generator 210 for application to a first input of an adder 226. The adder 226 receives its other input signals from the output of cascaded integrators 223 and 224 respectively of the identical construction to the vertical integrators 123 and 124 of FIG. 3 and from the output of an inverter 225 of the same construction as the inverter 125 of FIG. 3. As in the embodiment of FIG. 3, the integrator 223 takes its input from a vertical sync generator 211 and supplies its sawtooth wave pulses to the integrator 224 and to the inverter 225. The combined output from the adder 226 shown in FIG. 8e is applied to the control input of the gain controlled amplifier 9. The degree of amplification of the latter amplifier is varied as indicated by the hatched areas of FIG. 6, so that the modulated input to the amplifier 9 derived from the right, left or upper area of the target 5 experiences a lower degree of amplification that the signal derived from the remainder part of the target.

What is claimed is:

1. An automatic exposure control apparatus for a television camera including a camera tube having a photoelectrical conversion target on which light is made to be incident, an iris diaphragm disposed in the path of said incident light for varying the amount of said light, means for controlling said iris diaphragm in response to a control signal applied thereto, and means for generating a video signal from said conversion target in response to horizontal and vertical synchronization pulses, comprising:

first means for generating a modulating signal having a magnitude that decreases gradually over a portion of the period between successive pulses of one of said horizontal and vertical synchronizations, said portion corresponding to a peripheral area of said conversion target;

second means having a variable degree of amplification for modulating the amplitude of said video signal in accordance with said modulating signal so that the video signal is amplified at an amplification factor which gradually decreases as a function of distance from the center of said target; and third means responsive to the modulated video signal for generating a d.c. signal which is an average value of said modulated video signal and applying said d.c. signal to said diaphragm control means as said control signal.

2. An automatic exposure control apparatus as claimed in claim 1, wherein said first means is responsive to said horizontal synchronization pulses for generating said modulating signal.

3. An automatic exposure control apparatus as claimed in claim 1, wherein said first means is responsive to said vertical synchronization pulses for generating said modulating signal.

4. An automatic exposure control apparatus as claimed in claim 1 or 2, wherein said first means includes means for generating a modulating signal of substantially parabolic shape during the period of each horizontal synchronization.

5. An automatic exposure control apparatus as claimed in claim 1 or 3, wherein said first means includes means for generating a modulating signal of substantially pseudo-parabolic shape during the period of each vertical synchronization.

6. An automatic exposure control apparatus as claimed in claim 1, wherein said first means comprises:

means for generating a first modulating waveform in response to each of said horizontal synchronization pulses;

means for generating a second modulating waveform in response to each of said vertical synchronization pulses; and means for combining said first and second modulating waveforms and applying the combined waveform to said second means for modulation of said video signal.

7. An automatic exposure control apparatus as claimed in claim 6, wherein said first modulating waveform is substantially of parabolic shape.

8. An automatic exposure control apparatus as claimed in claim 6 or 7, wherein said second modulating waveform is substantially of pseudo-parabolic shape.

* * * * *